United States Patent [19]
Walker

[11] Patent Number: 4,782,650
[45] Date of Patent: Nov. 8, 1988

[54] MOWING APPARATUS

[75] Inventor: Dean M. Walker, Ft. Collins, Colo.

[73] Assignee: Walker Manufacturing Company, Fort Collins, Colo.

[21] Appl. No.: 91,416

[22] Filed: Aug. 31, 1987

Related U.S. Application Data

[63] Continuation-in-part of Ser. No. 606,530, May 3, 1984.

[51] Int. Cl.[4] ............................................. A01D 34/48
[52] U.S. Cl. ..................................... 56/16.6; 56/10.2; 56/202; 141/198
[58] Field of Search .................... 56/320.2, 320.1, 202, 56/16.6, 10.2, DIG. 15; 141/198 X, 206

[56] References Cited

U.S. PATENT DOCUMENTS

| | | | |
|---|---|---|---|
| 3,863,428 | 2/1975 | Baxter | 56/10.2 |
| 4,078,365 | 3/1978 | Ingalls | 56/10.2 |
| 4,589,249 | 5/1986 | Walker et al. | 56/202 |
| 4,635,047 | 1/1987 | Fox et al. | 56/10.2 |
| 4,709,541 | 12/1987 | Broman et al. | 56/202 |

FOREIGN PATENT DOCUMENTS 2647582  4/1977  Fed. Rep. of Germany ....... 56/16.6

Primary Examiner—John Weiss
Attorney, Agent, or Firm—Hugh H. Drake

[57] ABSTRACT

A vehicle is controllably powered to be steerably moved over an area. Mounted on the front of the vehicle is a cutter assembly. Also mounted on the vehicle is a hopper. Mowed cuttings are delivered by a conduit from the cutter to the hopper. An outlet mounted within the hopper is coupled in use to the conduit for distributing received cuttings on into the interior of the hopper. A driver mounted with respect to the hopper moves that outlet in a systematic pattern to vary the direction of distribution of the received cuttings.

An elongated paddle is mounted to swing reciprocally in correspondence with movement of the outlet. Upon the occurrance of impedence against the swinging of that paddle, by cuttings collected within the hopper, a switch is actuated to energize an indicator.

5 Claims, 10 Drawing Sheets

MOWING APPARATUS

The present application is a continuation-in-part of co-pending parent application Ser. No. 606,530, filed May 3, 1984 and assigned to the same assignee as the present application pending.

This invention pertains to mowing apparatus. More particularly, it relates to a kind of such apparatus in which clippings are conveyed to and accumulated in a hopper.

Self-propelled rideable lawnmowers have found favor with the public for convenience and efficiency of operation. An attractive approach to such mower apparatus is that disclosed in U.S. patent application Ser. No. 06/216,149, filed Dec. 15, 1980 by Wesley M. Walker et al, now U. S. Pat. No. 4,589,249 granted May 20, 1986. That mowing apparatus features a short turning radius and substantial horizontal stability. Its steering control is combined with its speed control, so that the operator need not divert at least one of his hands from a steering wheel or the like to some kind of throttle in order to achieve correlation as between direction of movement and adjustment of speed. That apparatus further has a hopper conveniently mounted on top of the vehicle so as to be easy to empty and to be out of the way during the mowing operation. Overall, that apparatus features flexibility and adaptation for ultimate mode of utility, while it is sufficiently simple of construction as to preserve a reasonable cost basis.

In the apparatus of the Walker et al prior patent, the cuttings are blown through a conduit for delivery into the hopper. In that case, the delivery outlet of the conduit system is located near the front of the hopper interior, so that the clippings are blown rearwardly. In general, the apparatus of that prior patent has enjoyed significant commercial success. Its features as mentioned above have enjoyed positive consumer response. However, one difficulty has been encountered in some instances. While its approach works excellently with dry grass to fill the hopper full of clippings before an included audible alarm is sounded, it has been found that the efficiency of the filling of the hopper may decrease when the grass being cut is wet and long. In that case, the clippings tend to build up right in front of the conduit outlet, eventually blocking the entrance of additional clippings well before the hopper is filled and possibly even prematurely causing the alarm to sound.

It is, accordingly, one specific object of the present invention to improve the manner of delivery of the clippings into the hopper of that prior mowing apparatus in order to overcome the problem just discussed.

A more general object of the present invention is to improve a system for delivering clippings into the interior of a hopper on various kinds of mowing apparatus other than that specifically disclosed in tne aforementioned prior application.

A related object of the present invention is to achieve the aforegoing ends in a manner which does not lead appreciably to increased cost.

Another object of the present invention, specifically addressed in this continuation-in-part application, is to provide a new and improved manner of obtaining an indication of a filled condition within the hopper.

In accordance with one specific embodiment of the present invention, the mower includes a vehicle controllably powered to be steerably moved over the area to be mowed. A cutter assembly mounted on the vehicle does the actual mowing. There is a hopper mounted on the vehicle together with means including a conduit for delivering cuttings from the cutter to the hopper. An outlet is mounted within the hopper and coupled in use to the conduit for distributing received cuttings on into the interior of the hopper. Driving means mounted with respect to the hopper moves that outlet in a pattern that varies the distribution of the received cuttings into the hopper. An indicator responds to a switch which is actuated by the occurrence of impedence against swinging of a paddle that projects outwardly from the outlet as to be swung thereby and encounter clippings collected or accumulated within the hopper.

The features of the present invention which are believed to be patentable are set forth with particularity in the appended claims. The organization and manner of operation of several specific embodiments of the invention, together with further objects and advantages thereof, may best be understood by reference to the following discription taken in connection with the accompanying drawings, in the several figures of which like reference numerals identify like elements, and in which:

Figure 1:
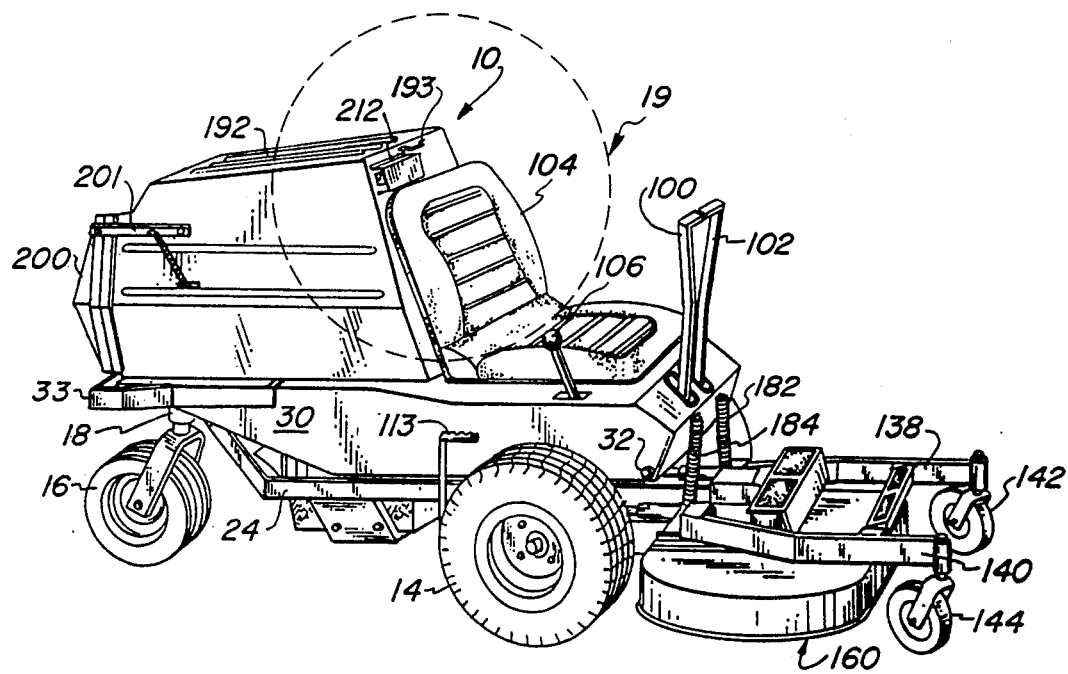
FIG. 1 is an isometric view of a mower which embodies the present invention.
Figure 2:
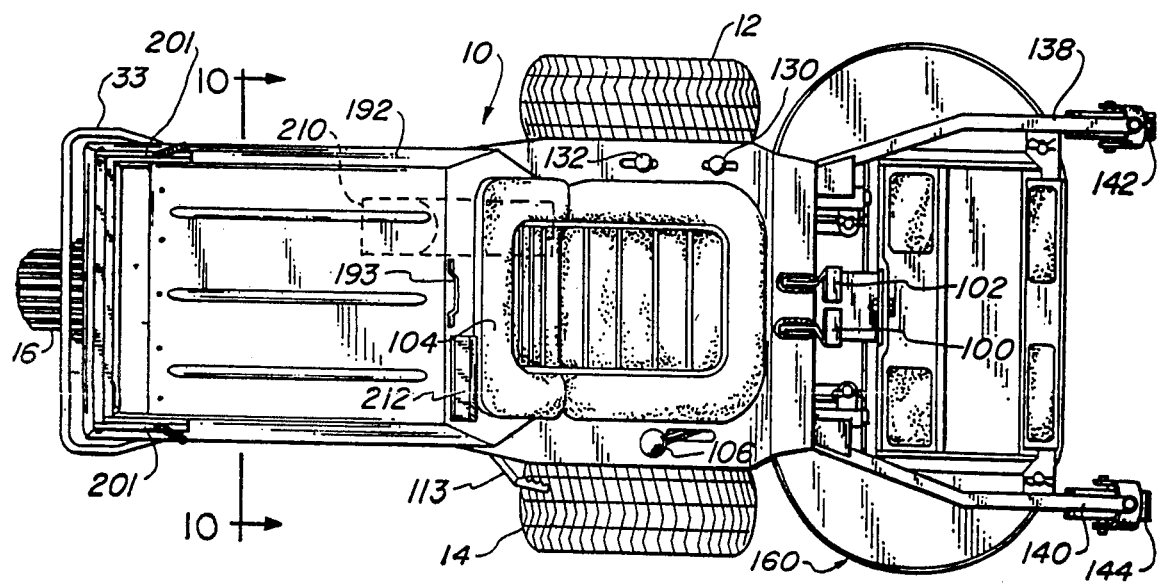
FIG. 2 is a top plan view of the mower shown in FIG. 1.
Figure 3:
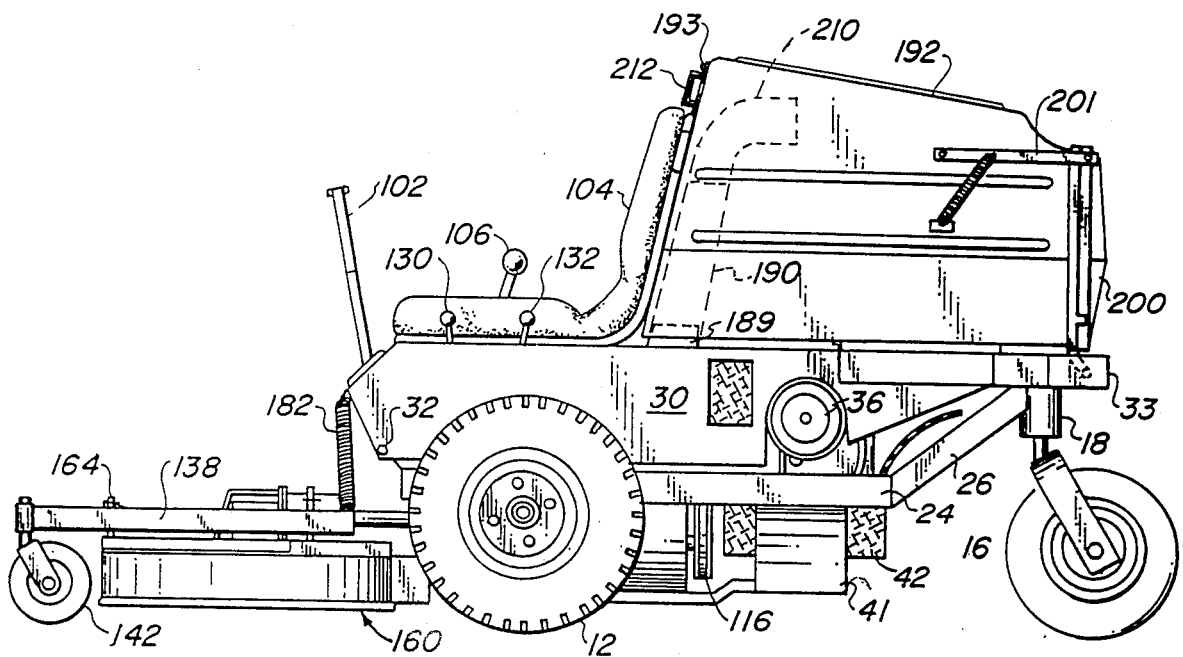
FIG. 3 is a side elevational view thereof.
Figure 4:
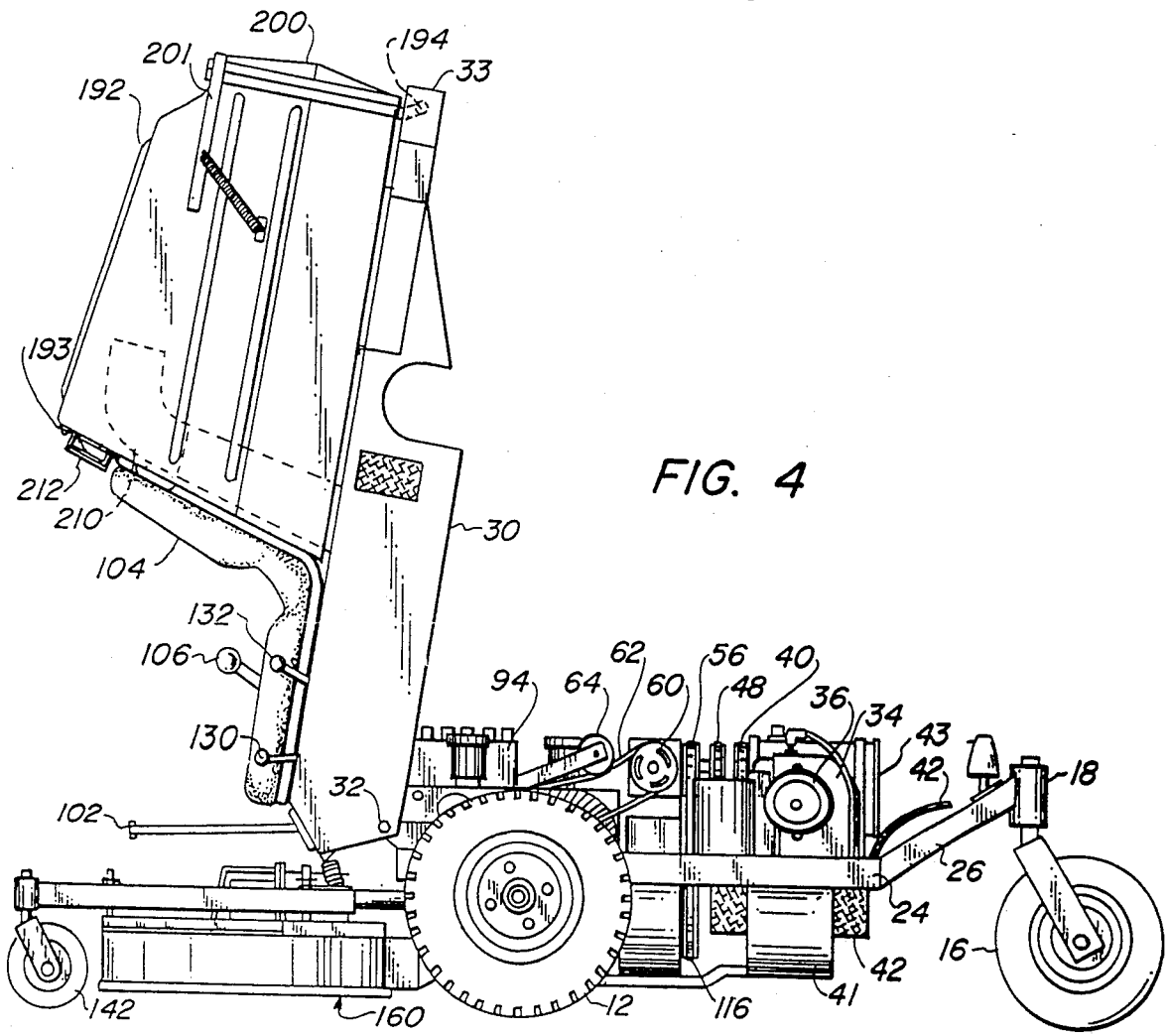
FIG. 4 is a view similar to FIG. 3 but with a component assembly disposed in a different position.

As described herein, the cutting, steering, powering, blowing and controlling components and functions are essentially the same in principle and often identical in structure to that which is shown in the aforesaid Walker et al prior patent. Accordingly, that patent is incorporated herein by reference and, to the extent reasonably possible, the same numbers are used herein for convenience of comparison.

A vehicle 10 is supported upon drive wheels 12 and 14 located at the front of the vehicle and a trailing wheel 16 at the rear of the vehicle and freely rotatable about a vertical axis by means of a pivot coupling 18. Bearings 20 and 22, carrying the respective axles for corresponding ones of wheels 12 and 14, are carried by an underlying main frame 24 which also is bent upwardly at 26 so as to support coupling 18.

Figure 6:
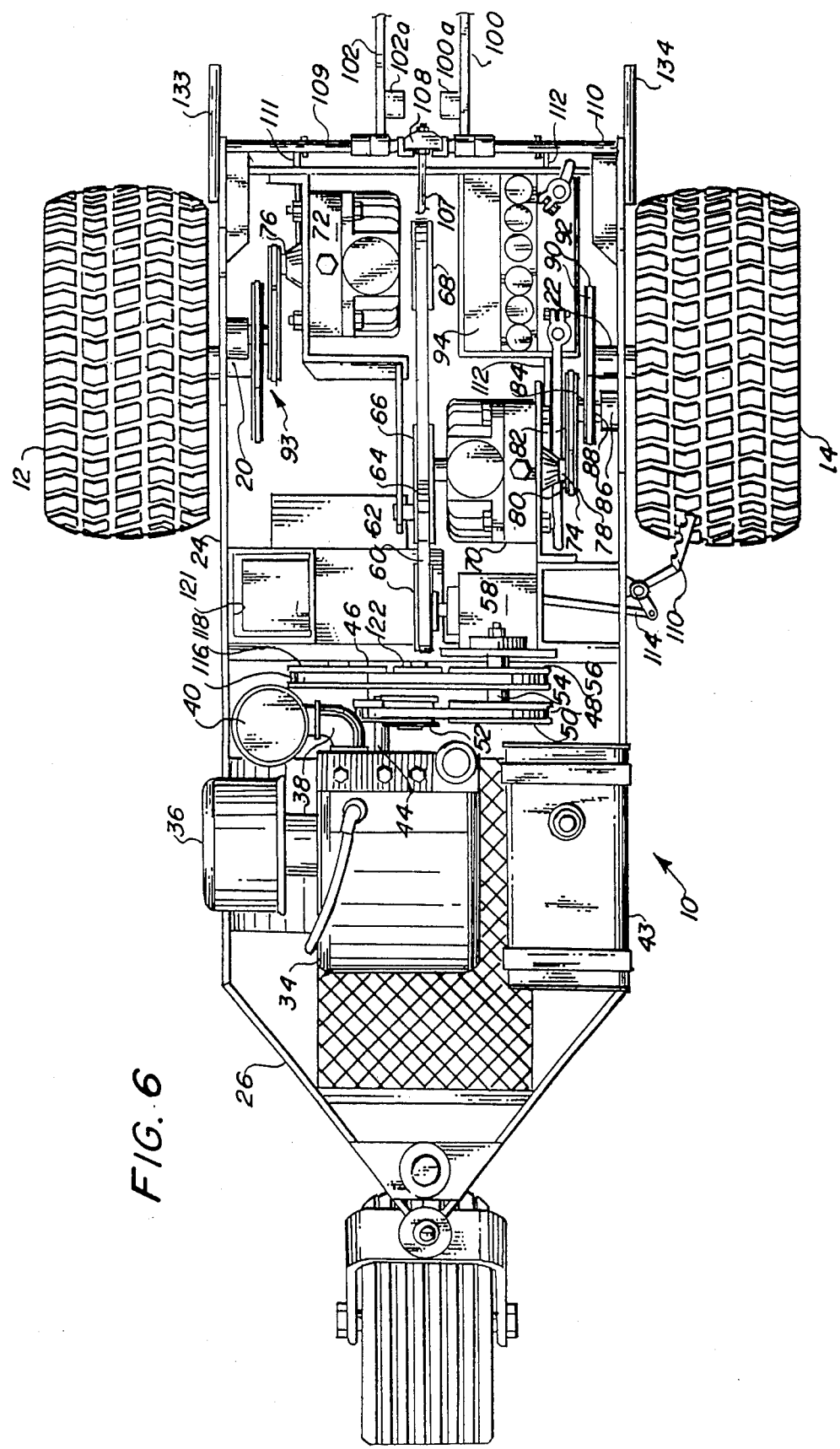
FIG. 6 is a fragmentary top plan view of a portion of that shown in FIGS. 1-3 but with covering components removed so as to expose the interior.
Figure 7:
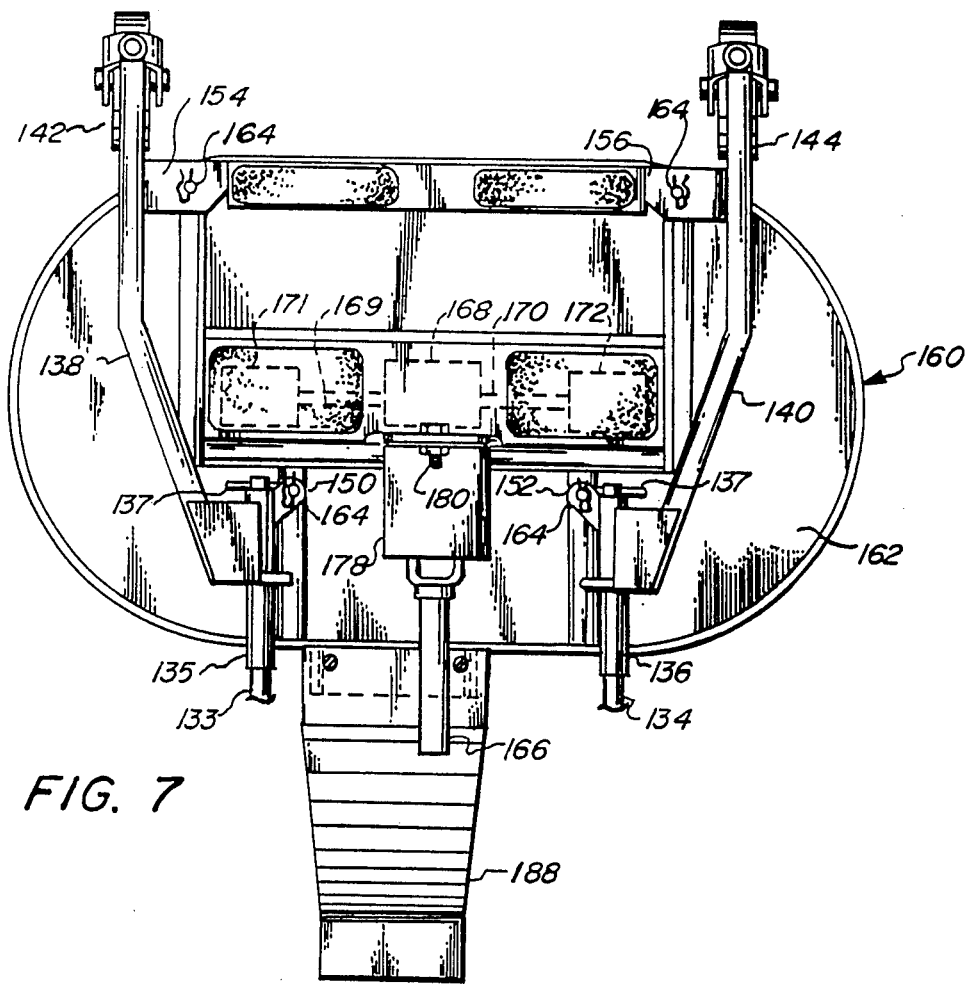
FIG. 7 is a top plan view of a fragmentary portion of the apparatus shown in FIG. 1.
Figure 8:
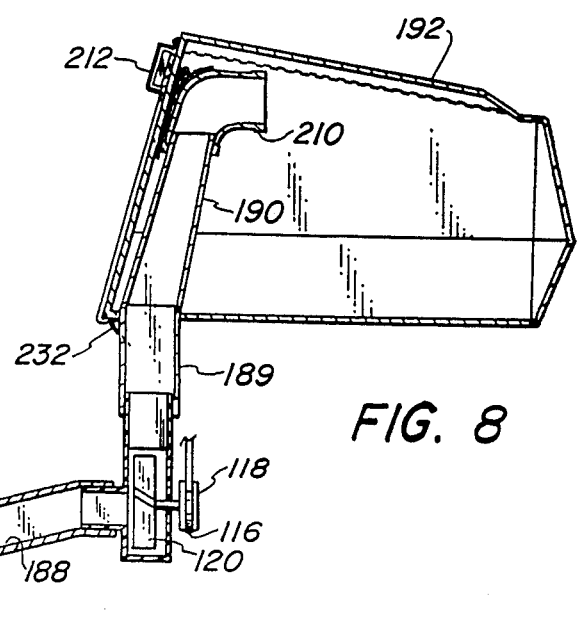
FIG. 8 is a fragmentary cross-sectional view of a portion of the apparatus as shown in FIG. 3.

Overlying frame 24 is a hood 30 that, in FIG. 6, has been entirely removed. Hood 30 is mounted at the forward end of the vehicle on a pivot at 32 so as to enable access to the enclosed machinery for inspection or service. At the rear, there is a bumper 33.

Carried by frame 24 in this case is a gasoline-fueled internal combustion engine 34 that has an air cleaner 36 and an exhaust pipe 38 which leads to a muffler 40. Engine 34 is carried from frame 24 by a mount 41. A portion of a mesh 42, that underlies the engine, preferably curves upwardly so as more fully to surround the engine compartment. Associated with engine 34 is a fuel tank 43. The motive output shaft 44 of engine 34 is attached to a pulley 46 from which runs a drive belt 48 that drives a pulley 50 and is maintained in tension by a spring-loaded idler pulley 52. Driven pulley 50 is mounted upon a shaft 54 that carries another pulley 56 and also drives a gearbox 58.

A pulley 60 on the output shaft of gearbox 58 drives a belt 62, held tight by a spring-loaded idler pulley 64, which drives both of pulleys 66 and 68 affixed to respective hydraulic motors 70 and 72. Each of motors 70 and 72 is of the variable-displacement type, so that its output power, as delivered by respective shafts 74 and 76, is selectively adjustable as between no rotation of its output shaft and maximum delivered power. Shaft 74 is coupled through a chain drive 78 from a sprocket 80 to a sprocket 82 carried on a shaft 84 mounted in a bearing 86 affixed to frame 24. Another sprocket 88 on shaft 84 drives a chain 90 which in turn is in engagement with a sprocket 92 on the axle contained within bearing 22. In the same manner, the output from motor 72 by way of shaft 76 drives a corresponding chain and sprocket assembly 93 which causes rotation of wheel 12 mounted on an axle within bearing 20.

A battery 94 also is mounted with respect to frame 24 and at least supplies power for starting engine 34. In that connection, of course, engine 34 includes an alternator or generator for recharging battery 94, and vehicle 10 may, if desired, be supplied with a lighting system so as to enable use in nightime operation.

The displacement, and thus the speed of output shaft rotation of motors 70 and 72, is controlled individually by respective operating levers 100 and 102 which project upwardly from hood 30 in a position directly in front of the operator who is seated upon a seat 104 provided atop hood 30. Each of levers 100 and 102 is spring loaded, so as normally to rest in a forward position at which position its associated motor 70 or 72 is rendered operative to deliver power to its respective one of wheels 12 and 14. By pulling back on one or the other of levers 100 and 102, the respective hydraulic drive motor is throttled down or cut off so as at least to reduce the delivery of power to the corresponding wheel. Thus, vehicle 10 may be caused to pivot about either one of its wheels 12 and 14 as selected by the operator, and trailing wheel 16 simply follows such movement.

In this case, to the right of the operator situated in seat 104, there is a forward speed control lever 106. Lever 106 operates a cable 107 attached to a dog assembly 108 that rotates shafts 109 and 110. Shaft 109 has an underlying radial finger which controls movement of a rod 111 affixed to the conventional control lever on the underside of motor 72 for adjusting the rotational speed of its output shaft 76. Analogously, shaft 110 has an underlying finger which controls movement of a rod 112 that adjusts speed delivered from motor 70. The position of dog assembly 108, under control of lever 106, determines the maximum speed at which motors 70 and 72 can operate so as to drive wheels 12 and 14. On the other hand, levers 100 and 102, located directly in front of the operator, enable him to control his steering without the necessity of being concerned about speed control. That is, each of levers 100 and 102 overrides the speed control on its respective wheel otherwise imposed by the supply of power from the engine. That override occurs when ears 100a and 102a, respectively on levers 100 and 102, engage the corresponding releases disposed on the sides of dog assembly 108. By pulling back on both of levers 100 and 102, moreover, the operator can reduce speed irrespective of any other powered operation.

Figure 9:
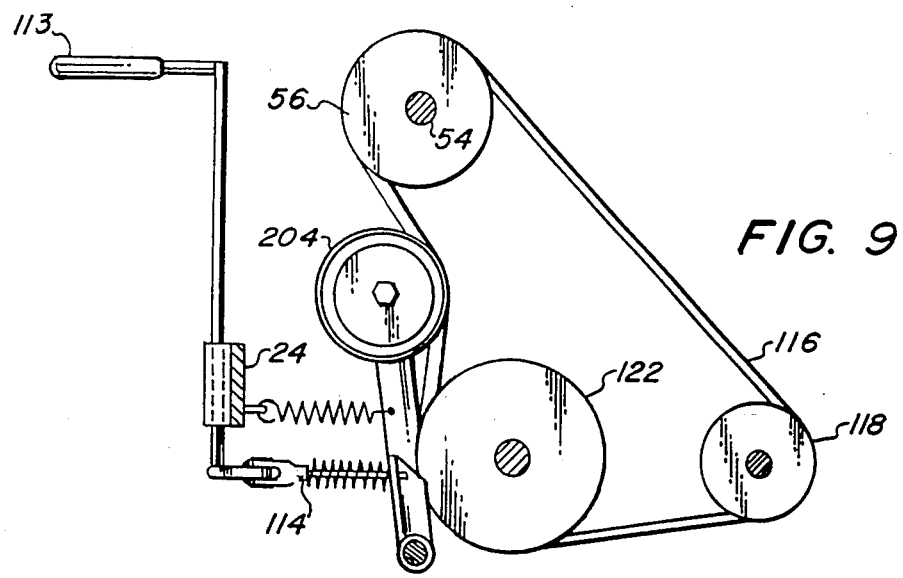
FIG. 9 is a fragmentary front elevational view of a clutch and driving linkage the location of which can be seen in FIGS. 4 and 6.
Figure 10:
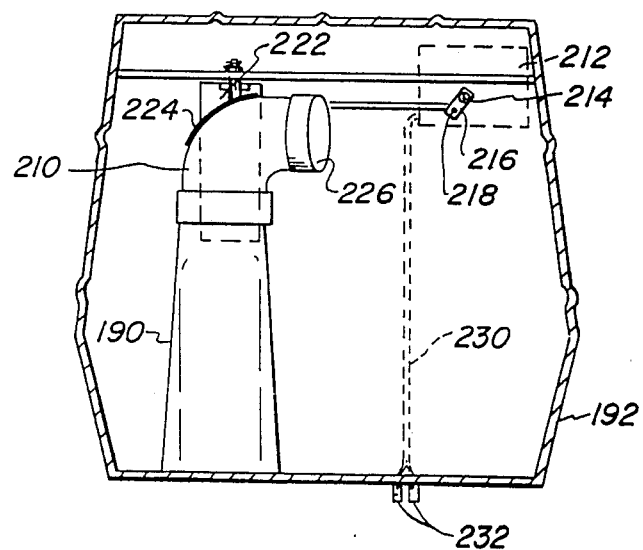
FIG. 10 is a fragmentary cross-sectional view taken along the line 10—10 in FIG. 2.
Figure 11:
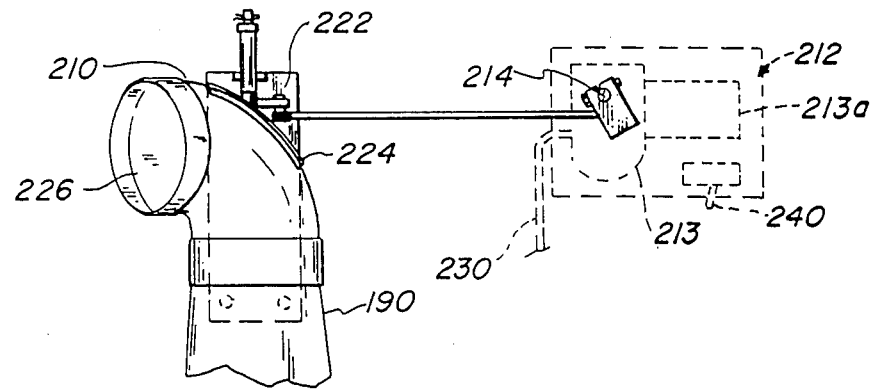
FIG. 11 is an enlarged fragmentary view which illustrates a portion of that shown in FIG. 10.

Located to the right of the operator situated in seat 104 is a cluth lever 113. It is connected by a linkage 114 to a clutch pulley that serves to control the delivery of motive power from pulley 56 to associated components. That is, still another pulley 204 is disposed beneath pulley 56 and is mounted to swing into and out of engagement with a belt 116 (FIG. 9). That swinging movement is under the control of lever 113 and serves to enable the tightening of a belt 116 when power is to be delivered to such other apparatus.

Pulley 56 drives belt 116 and that belt turns a pulley 118 which rotates a blower 120. Belt 116 also turns a power take-off pulley 122. Upon operation of lever 113, therefore, the clutch mechanism may be operated so as completely to disable the supply of operating power to all associated apparatus such as the blower and the mower yet to be further described. At the same time, the vehicle can be fully controlled for its own movement over an area.

Situated to the left, in this case, of the operator located on seat 104 is a throttle lever 130 and a choke lever 132 connected by suitable cables to engine 34 for the normal purposes. Once engine 34 has been started, its speed basically is allowed to remain constant at a suitable running value. All control of speed of movement of the vehicle is thereafter by means of the hydrualic control system herein described.

Projecting forwardly from the front of frame 24 are laterally-space-opposed rods 133 and 134. Rods 133 and 134 are received individually within respective sleeves 135 and 136 and held in place by cotter pins 137. Individually secured to and projecting from each of sleeves 135 and 136 are respective arms 138 and 140 that project on forwardly from the vehicle and individually carry respective dolly wheels 142 and 144 on their most-forward end portions.

Projecting outwardly from the end portions of each of sleeves 135 and 136 are respective ears 150 and 152 each of which includes a central opening. Somewhat similarly projecting laterally from the outer end portions of each of arms 138 and 140, just before the position of dolly wheels 142 and 144, are further ears 154 and 156 that again define openings.

Effectively mounted to arms 138 and 140 by means of ears 150-156 is a cutting assembly 160. Projecting upwardly from the shell 162 of assembly 160 are a plurality of pins 164 so positioned as to be received through the corresponding openings in the different ones of the ears and held in place therethrough simply by means of cotter keys as shown. Pins 164 preferably include a vertical series of holes for selectively receiving the cotter keys and, thus, allowing for height adjustment at all corners of assembly 160.

Coupled to cutter assembly 160 is a drive shaft 166 which is coupled at its motive-input end to receive power from pulley 122 and, in turn, is coupled through a conventional universal joint (in a housing 178) at its output end to a transfer case 168. In this case, shaft 166 is square and slips into the end of another shaft ultimately coupled to the shaft of pulley 122. From transfer case 168, stub shafts 169 and 170 extend to respective gear boxes 171 and 172. Gear boxes 171 and 172 connect to corresponding ones of a pair of laterally displaced blades 174 that mow the grass. Housing 178 is secured to cutter assembly 160 by means of a bolt 180.

This arrangement permits easy and quick removal of the entire cutter assembly from the vehicle. Thus, any other working device, such as a snow blower or a rototiller, may easily be substituted, so long as it has correspondingly-located mounting pins 164 and the provision of an equivalent to shaft 166, or a coupling to the universal joint within housing 178, for using motive power delivered from the vehicle.

The additional provision of dolly wheels 142 and 144 adds significantly to the overall geometrical stability of the apparatus while yet not at all interfering with the capability of achieving sharp turns of the vehicle. As indicated, simple use of pins 164 and their cotter keys leads to ready detachability of the illustrated cutter assembly and for the substitution of a different attachment. Tension springs 182 and 184 preferably are coupled between the front end of hood 30 and sleeves 135 and 136 at about the point of juncture of the latter to arms 138 and 140. Those springs serve directly to transfer weight from assembly 160, and thus off dolly wheels 142, onto drive wheels 12 and 14. For the illustrated version which is about eighty-four inches in overall length, measurements indicate a transfer of about forty pounds from assembly or deck 160 to the drive wheels.

Projecting rearwardly from the marginal wall of shell 162 is a snout 186 that, upon installation, is received within a conduit 188. Conduit 188 is directed backwardly through frame 24 to blower 120. From blower 120, the conduit continues at 121 into telescoping portions 189 and 190 and exhausts into a hopper 192 located atop vehicle 10.

Figure 5:
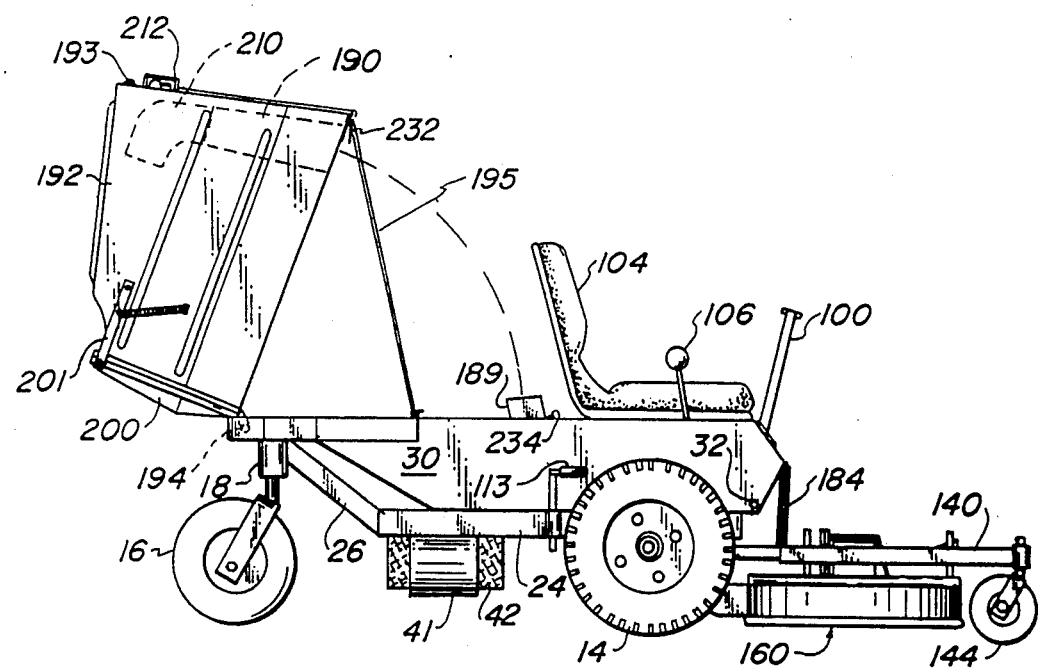
FIG. 5 is an oppositely-taken side elevational view of the mower of FIG. 1 and with a different component assembly changed in position.

Hopper 192 is located on vehicle 10 in a position generally behind seat 104. It is mounted to hood 30 by means of a pivotal connection thereto at 194. A handle 193, disposed exteriorly on the front wall of hopper 192, permits swinging of the hopper about pivot 194. This enables the hopper to be swung to a near vertical position for dumping of the clippings contained in the hopper as indicated in FIG. 5, the swing being limited by a flexible tie 195. This differs specifically from the mounting by means of a parallelogram linkage as shown and described in the aforesaid Walker et al patent. In one alternative contemplated, the mounting arrangement incorporates the parallelogram linkage as described in that prior application. In either event, the hopper preferably is closed by a swingable hinged door 200. In this case, the upper ends of the side margins of door 200 are hingedly mounted to hopper 192 by means of spring-loaded link-arms 201 so angled to their pivotable connection to the hopper, as shown, that, with the hopper lowered into place to receive clippings, door 200 may be toggled into an over-centered position, so as to remain open.

Included in hopper 192 may be a fill detector as described in the prior application. It is simply a beeper, powered either from battery 94 or having its own battery, and actuated by a pressure responsive switch coupled through a tube into the interior of conduit portion 190. An audible alarm sounds when the hopper is filled.

Telescoping outlet portion 190 continues vertically into the interior of hopper 192 and terminates in an elbow 210 that is mounted for rotation about a generally vertical axis. That coupling of elbow 210 to portion 190 is a frictional slip fit, so as to permit elbow 210, which becomes the ultimate outlet, to be swung horizontally within the interior of hopper 192. To that end, a motor assembly 212 is mounted on the front wall of hopper 192. Motor assembly 212 includes a conventional gear box 213 and motor 213a to enable it to provide a reciprocating rotation of its output shaft 214. As actually implemented, motor assembly 212 is a conventional drive system for windshield wipers employed on automotive vehicles. When energized, the motor assembly causes shaft 214 to rock back and forth.

Mounted on shaft 214 is an arm 216 to the outer end of which is pivotally connected at 218 a drive link 220. A bracket 222, affixed to the front wall of hopper 192, pivotally mounts a saddle 224 secured to the intermediate portion of elbow 210. The forward end of link 220 is mounted by a universal joint 226 to saddle 224. Accordingly, reciprocation of arm 216 moves link 220 back and forth in a longitudinal direction and that movement, in turn, causes saddle 224 to swing the ultimate outlet 226 of elbow 210 back and forth in a horizontal direction. This serves to distribute the delivered clippings more or less uniformly over the width of the interior of hopper 192. Even when the clippings are long and wet, such movement of outlet 226 causes the clippings to be spread out from one side to the other of hopper 192, and this tends to prohibit the build-up of clippings directly in front of outlet 226 which otherwise would prematurely inhibit complete filling of the hopper before time for the removal therefrom of clippings collected.

Motor assembly 212 is electrically connected by a cable 230 to a pair of contacts 232 on the underside of hopper 192. A mating pair of contacts 234 are disposed atop hood 30 so as to engage with respective contacts 232 when hopper 192 is moved into its use position, whereupon conduit portion 190 is engaged with the remainder of the conduit assembly.

Contacts 234 are supplied with power from battery 94 under the control of the ignition switch for engine 34 or, alternatively, from a different switch 240 for disabling motor assembly 212 when the mowing apparatus is not in use. With the unit in operation, motor assembly 212 energizes and causes reciprocation of outlet 226 whenever hopper 192 is moved back into its in-use position.

It will be observed that the reciprocal movement imposed upon outlet 226 causes the pattern of delivery of the clippings to systematically vary. Yet, this is accomplished with an exceedingly simple adaptation that uses what need be only cast or stamped parts and even permits the use of such a simple driving element as a windshield wiper motor to accomplish the result.

As indicated above, a pressure-responsive audible alarm may be included on the hopper in order to provide an indication of a filled condition. An improved and different clipping-level-fill detector is the subject of FIGS. 13-19.

Figure 13:
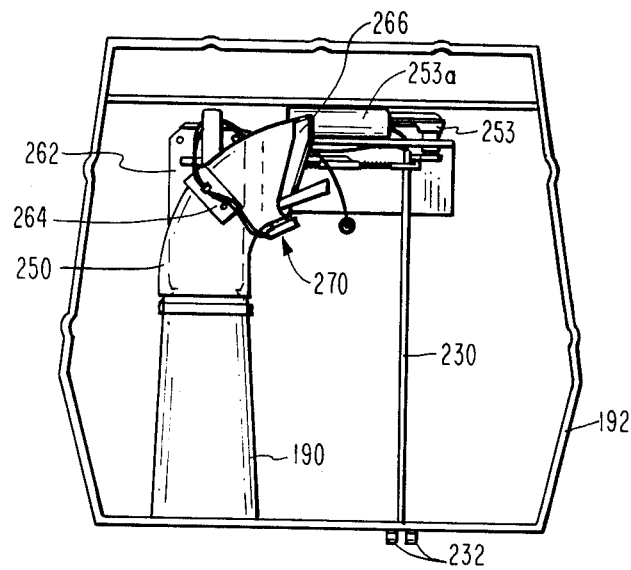
FIG. 13 is a view similar to FIG. 10 but showing a further improvement upon the present invention.
Figure 14:
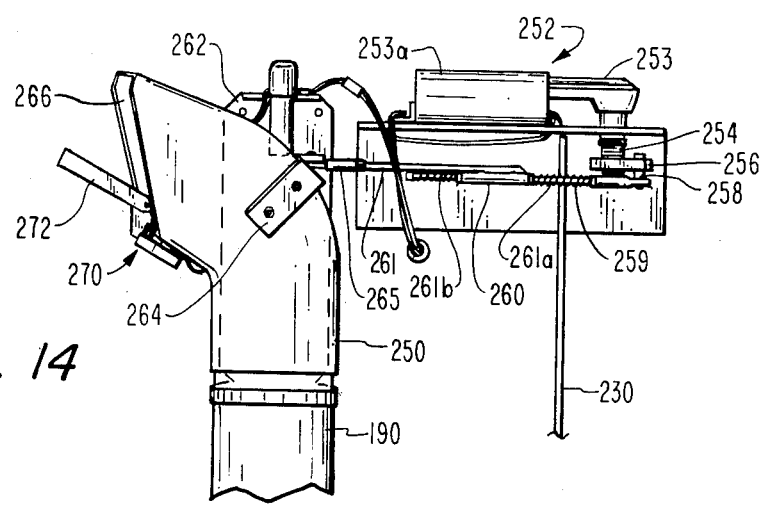
FIG. 14 is a view similar to FIG. 11 but which pertains to the improvement shown in FIG. 13.

As shown in FIGS. 13 and 14, telescoping outlet portion 190 continues vertically into the interior of hopper 192 and terminates in an elbow 250 that is mounted for rotation about a generally vertical axis. That coupling of elbow 250 to portion 190 is a frictional slip fit, so as to permit elbow 250, which becomes the ultimate outlet, to be swung horizontally within the interior of hopper 192. To that end, a motor assembly 252 is mounted on the front wall of hopper 192. Motor assembly 252 includes a conventional gear box 253 and motor 253a to enable it to provide a reciprocating rotation of an output shaft 254. As actually implemented, again, motor assembly 252 is a conventional drive system for a windshield wiper as employed on automotive vehicles. When energized, the motor assembly causes shaft 254 to rock back and forth.

Mounted on shaft 254 is an arm 256 to the outer end of which is pivotally connected at 258 a drive link 259. A sleeve 260 slides on link 259 and is coupled to a driven link 261. Sleeve 260 is disposed between a spaced pair of resilient compression springs 261a and 261b captivated on a central portion of link 259 as illustrated.

A bracket 262, affixed to the front wall of hopper 192, pivotably mounts a saddle 264 secured to the intermediate portion of elbow 250. The forward end of link 261 is coupled by a pivotal joint 265 to a stub on saddle 264. Accordingly, reciprocation of arm 256 moves link 261 back and forth in a longitudinal direction. That movement, in turn, causes saddle 264 to swing the ultimate outlet 266 of elbow 250 back and forth in a horizontal direction. This serves to distribute the delivered clippings more or less uniformly over the width of the interior of hopper 192. Even when the clippings are long and wet, such movement of outlet 266 causes the clippings to be spread out from one side to the other of hopper 192, and this tends to prohibit the build-up of clippings directly in front of outlet 266 as before.

Motor assembly 252 is electrically connected by cable 230 to contact pair 232 on the underside of hopper 192. Again, pair 232 mate with contacts 234 in the same manner as described earlier and in order to cause reciprocation of outlet 266 whenever hopper 192 is moved back into its in-use position.

Figure 15:
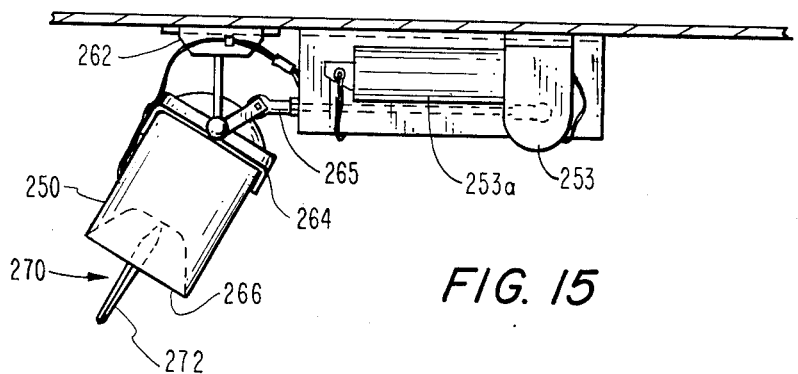
FIG. 15 is a view similar to FIG. 12 but modified to show that further improvement.
Figure 16:
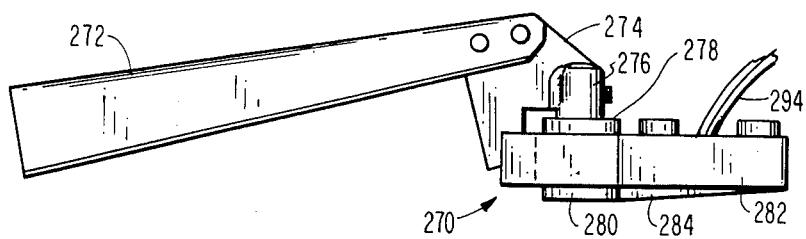
FIG. 16 is a fragmentary, enlarged side elevational view of a component assembly specifically observable in FIGS. 13-15.
Figure 17:
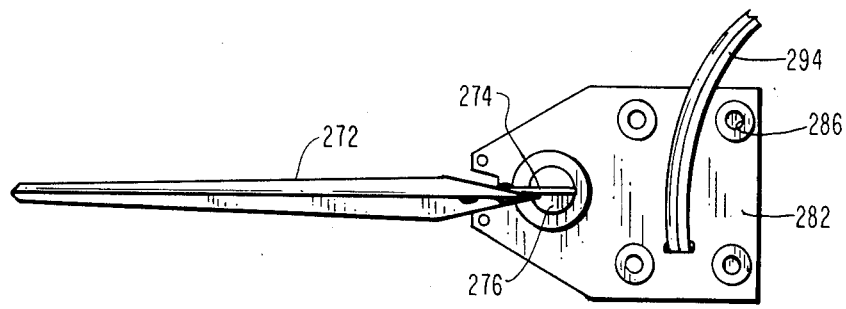
FIG. 17 is a top plan view of the assembly shown in FIG. 16.
Figure 18:
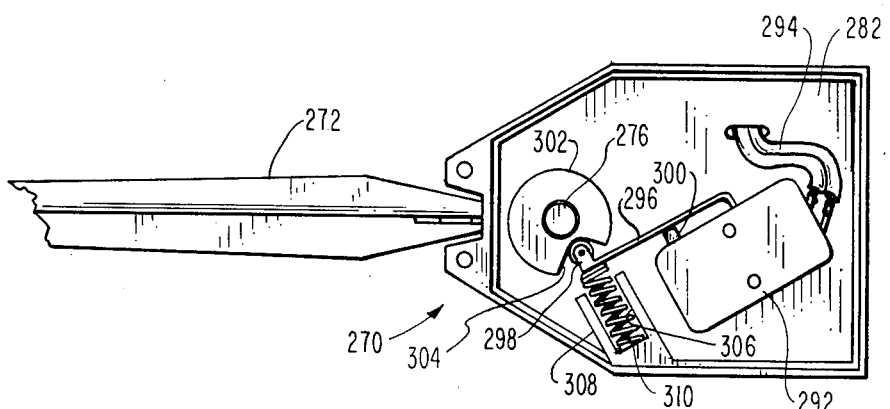
FIG. 18 is a bottom plan view of the assembly shown in FIGS. 16 and 17 and from which a bottom cover subassembly has been removed.
Figure 19:
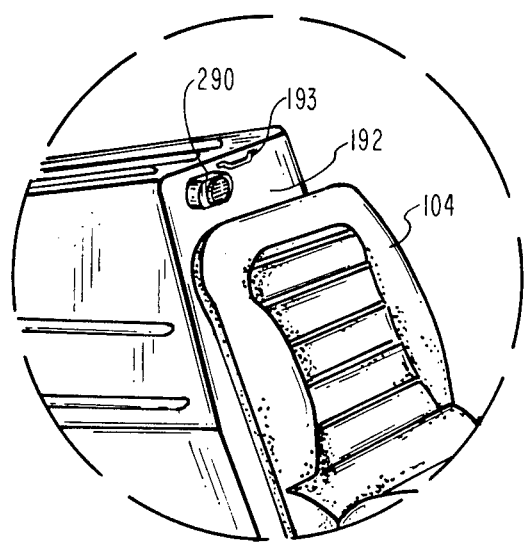
FIG. 19 is a fragmentary view, taken similarly to a portion of FIG. 1, showing a modification in the latter in accordance with the subject matter of FIGS. 13-18.

As indicated generally in FIGS. 13-15 but described in more detail with respect to FIGS. 16-18, a fill or clipping-level detector 270 is mounted at the bottom of outlet 266. Included within detector 270 is a paddle 272 specifically secured at one end to a strut 274 which, in turn, is affixed to a projecting portion of a rotatable shaft 276. As illustrated, paddle 272 is in a preferred form which has a T-shaped cross-section for imparting rigidity.

Shaft 276 is mounted through a bearing 278 formed into a housing 282 and a bearing 280 formed into a cover 284 mounted over the bottom of housing 282. Fasteners inserted through a plurality of openings 286 in housing 282 enable the attachment of the housing to the wall of elbow 250 at outlet 266. Thus, paddle 272 has its inner end coupled to outlet 266 in a position projecting outwardly therefrom. Consequently, paddle 272 swings reciprocally over a width portion of hopper 192 in correspondence with the reciprocal movement of outlet 266.

Mounted on the exterior wall of hopper 192, immediately behind seat 104 for the operator, is an indicator 290 which in this case is an acoustic horn or buzzer which emits sound upon being energized with a direct-current signal. Mounted within housing 282 and connected by means of a cable 294, to complete a direct current circuit to horn 290 for acutation, is a switch 292. Conveniently, switch 292 is a conventional microswitch having an actuator 296 on the outer end of which is a roller 298. As usual, actuator 296, when flexed downwardly, depresses a pushbutton 300.

Secured to the lower portion of shaft 276 is a switch operator in the form of cam 302 which has the shape of a disk one sector of which is cut out to define a notch 304. Omitted from view for clarity are a pair of washers which space cam 302 between the upper and lower walls of housing 282. Mounted within a well 306 of a stub 308, that projects inwardly from a side wall of housing 282, is a compression spring 310 which exerts a resilient force against the outer end of actuator 296 and thereby urges roller 298 against cam 302. In principle, spring 310 performs the same function as a spring located within microswitch 292 in urging actuator 296 outwardly by means of pushbutton 300. In using a conventional microswitch, however, the degree of resilient urging which tends to dispose push-button 300 outwardly was found to be insufficient to cause roller 298 to lodge normally in the bottom of notch 304 and thereby nominally retain paddle 272 in a centered position. In that connection, it will be observed that paddle 272 is subjected to the impelling force of clippings being delivered from outlet 266.

In operation when hopper 192 is being filled with clippings, shaft 276, and hence paddle 272, is held in a nominally centered position as paddle 272 itself swings back and forth in correspondence with movement of outlet 266. When, however, the accumulation of clippings within hopper 192 rises to the level of approximately the bottom of outlet 266, the upper surface portion of the clippings present an impedence to paddle 272 against its swinging movement. As a result, paddle 272 is deflected relative to outlet 266 and cam 302 is caused to rotate. That rotation effects the deflection of actuator 296 in the direction to close the contacts within microswitch 292. The contact closure completes the circuit which serves as a signal that energizes acoustic indicator 290.

Figure 12:
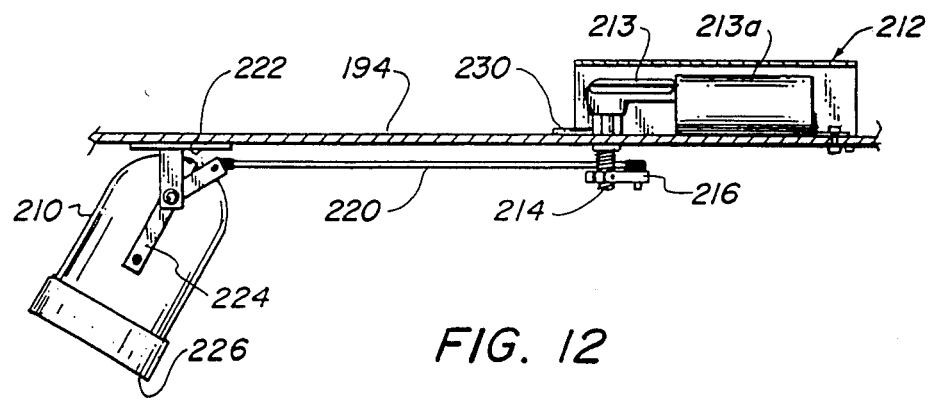
FIG. 12 is a fragmentary cross-sectional view taken downwardly on that which is shown in FIG. 11.

Utilizing a conventional motor 253' of the kind mentioned, which is readily and economically available by reason of the use of the same kind of motor and gear box in vehicular windshield-wiper service, the force delivered to cause reciprocation of outlet 266 is significant. With the fixed linkage 220 as shown and explained with respect to FIG. 12, satisfactory performance normally will be obtained. When, however, the density of the collected cuttings is high (especially when there is substantial moisture content), the cuttings tend to pile up toward each side of outlet 266. Paddle 272 would then be blocked by the side of outlet 266 and motor 253' undesireably would be stalled. In the system illustrated, however, the resiliency of the linkage afforded by springs 261a and 261b is of a degree sufficient to permit the motor to continue operation in order to reverse the direction of swing of outlet 266 and, hence, of paddle 272.

It will be observed that, as compared to the pressure-responsive kind of fill detector mentioned earlier, the arrangement using paddle 272 yields a positive response to the completion of filling. That response is obtained notwithstanding what may be significant variations in the density of the accumulated clippings or a failure of sufficient pressure development by reason of leakage around door 200.

While particular embodiments of the invention have been shown and described, and various alternatives and modifications have been taught, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. A mower comprising:
   a vehicle controllably powered to be steerably moved over an area to be mowed;
   a cutter assembly mounted on said vehicle for mowing;
   a closed hopper mounted on said vehicle;
   means including a conduit for delivering cuttings from said cutter assembly to said hopper;
   an outlet mounted within the upper interior of said hopper for distributing cuttings, received from said conduit, on into the interior of said hopper;
   driving means mounted with respect to said hopper for continuously moving said outlet reciprocally in order to vary the direction of distribution of said received clippings in a repetitive pattern over a portion of the width of said interior;
   an elongated paddle;
   means for coupling one end of said paddle to said outlet in a position projecting outwardly therefrom whereby nominally to swing reciprocally over said portion of the width in correspondence with reciprocal movement of said outlet;
   means responsive to a signal for providing an indication;
   a switch actuatable to effectuate said signal;
   and means, included within said coupling means, for actuating said switch upon the occurrence of impedance against swinging of said paddle, during said movement of said outlet, by said cuttings as collected within said hopper.

2. A mower as defined in claim 1 in which said actuating means responds to said occurrence in either direction of movement of said outlet.

3. A mower as defined in claim 1 in which said coupling means includes a rotatable shaft to one portion of which said one end is secured, and in which a switch operator is secured to another portion of said shaft with said switch being actuated by said operator in responce to rotation of said shaft.

4. A mower as defined in claim 1 which includes means for biasing said paddle normally to a position in which said switch is deactuated.

5. A mower as defined in claim 1 in which said driving means includes a motive power source coupled to said outlet by a resilient linkage, and in which the degree of resiliency in said linkage is sufficient to enable continued operation of said motive power source when movement of said outlet and said paddle is blocked by accumulation of said cuttings.

* * * * *